UNITED STATES PATENT OFFICE.

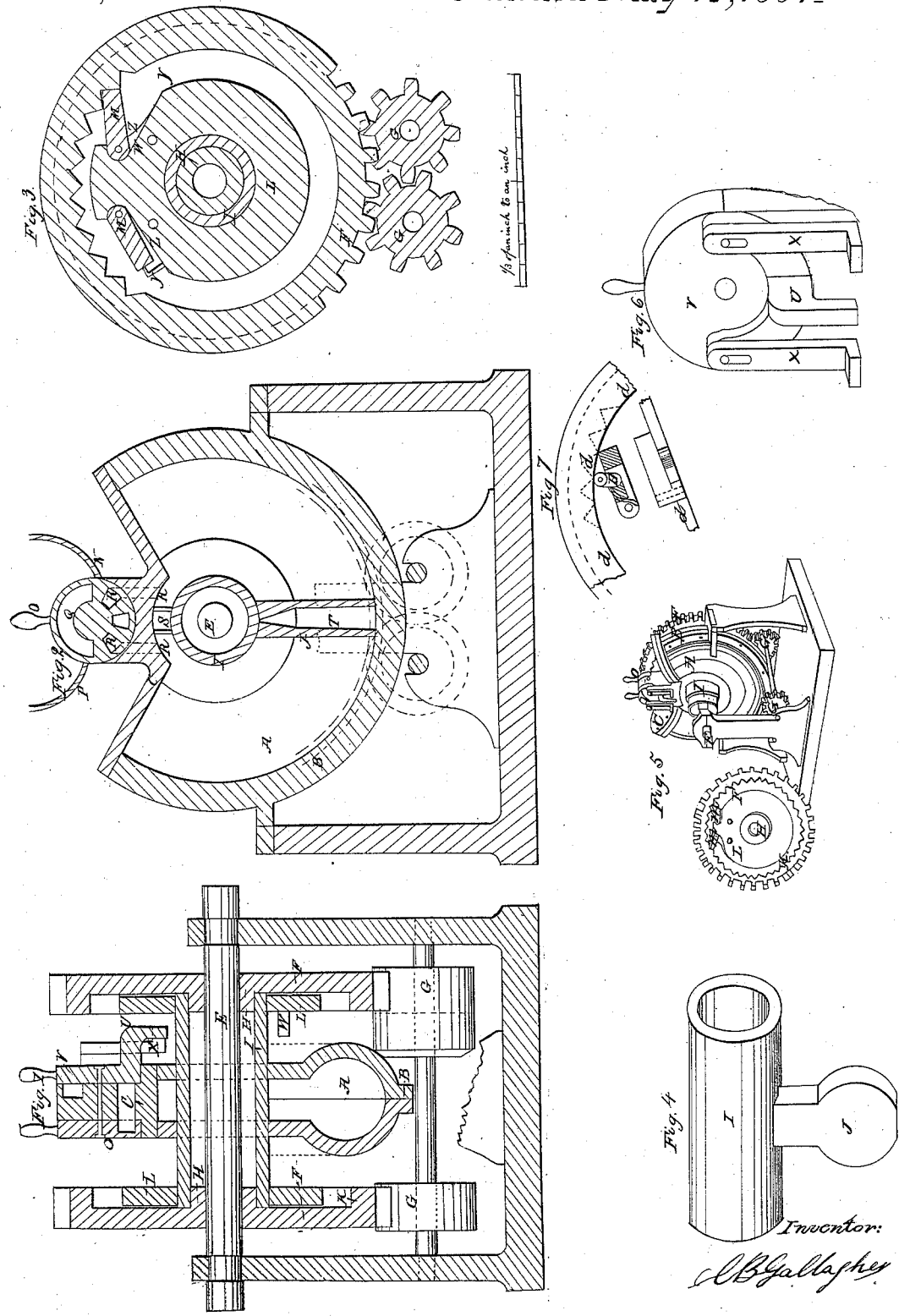

C. B. GALLAGHER, OF ALLEGHENY CITY, PENNSYLVANIA.

SEMIROTATIVE STEAM-ENGINE.

Specification of Letters Patent No. 17,271, dated May 12, 1857.

*To all whom it may concern:*

Be it known that I, C. B. GALLAGHER, of Allegheny City, in the county of Allegheny and State of Pennsylvania, have invented certain Improvements in Semirotative Steam-Engines; and I do hereby declare that the following is a full and exact description thereof, reference being had to the accompanying drawing and to the letters of reference marked thereon.

The nature of my invention consists in the arrangement of devices or means for producing circular motion from a semirotative piston.

To enable others skilled in the arts to make and use my invention, I will proceed to describe its construction and operation.

I construct a cylinder in a circular form about two thirds of a circle (see Figure 2) A, the same to be in halves and bolted together by flanges B and closed with cap C.

E shows the main shaft in the center of the circle of the cylinder. On said shaft I construct two cog wheels F F one to be fast to said shaft and the other to run loose, said cog wheels to gear with separate spur wheels or pinions G, G, which pinions are geared together thus causing wheels F, F, to run one of them one way and the other the reverse. On the inside of cog wheels F are hubs H to which is fitted a sleeve I the same running through the cylinder over main shaft and to which is attached piston J, the rims of wheels F projecting on the inside (corresponding to the hubs) have ratchet teeth K. On each end of sleeve I are wheels L firmly keyed on. On said wheels L are clutches M, acting on ratchet teeth K, thus the reciprocal motion of piston J togther with sleeve K, wheels L and clutches M gives motion to wheels F, F, working alternate on one and then the other keeping up a steady and uniform application of power.

N shows steam pipe which conveys steam into the throttle valve O.

P shows the escape pipe from escape chamber Q.

R shows the entrance of steam into cylinder.

Between said entrances R is metallic packing S held between two copper plates.

T shows packing on piston. Space is also left for packing between cylinder and sleeve I.

U shows a knocker which gives movement to valve V.

W shows pins on one of wheels L which comes in contact with knocker U which gives a partial opening of valve V reciprocating the motion and as piston starts back pins W run over cams or port X which completes the opening of valve V. Thus a reciprocating motion is kept up on piston sleeve and clutches giving a constant rotary motion to main shaft. Clutches M are put in double when back action is required and one pair of them fastened down by hooks Y the other pair being kept in contact with ratchet teeth K by springs Z.

Fig. 7 shows an improvement in the clutches M by which will be seen an eccentric and friction roller D, to alleviate the noise and friction caused by the clutch running back over the ratchet teeth.

*d* is a plane on which friction roller runs on when the clutch goes backward. There is also a spring to throw friction roller out when the clutch rises on the point of ratchet teeth. I will use Fig. 7 or its equivalent on the same principle.

What I claim as my invention and desire to secure by Letters Patent is—

In the arrangement of means herein set forth for producing continuous rotary motion from the semi rotative piston of the engine.

C. B. GALLAGHER.

Witnesses:
A. W. FOSTER,
JAMES B. HASLIT.